(No Model.)
H. B. ADAMS.
PLANT DUSTER.
No. 455,785. Patented July 14, 1891.
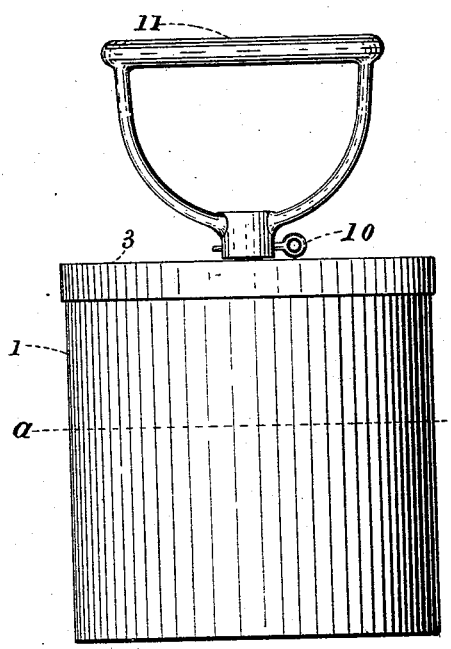
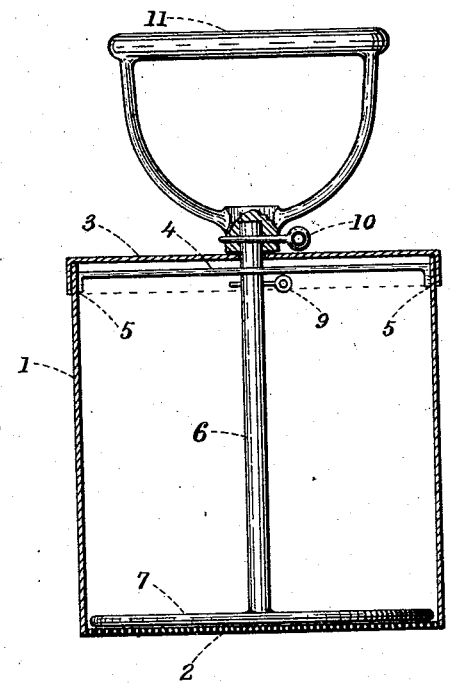
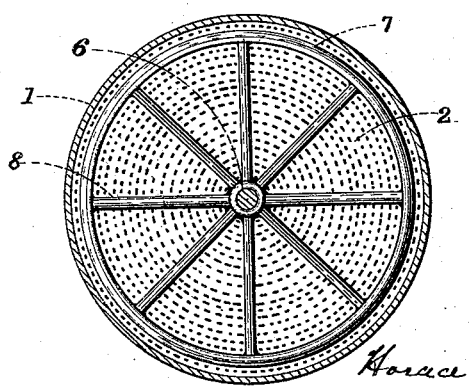
Witnesses.
Cora J. Blakeley
Arthur J. Sangster.
Horace B. Adams. Inventor.
By James Sangster
Attorney.

UNITED STATES PATENT OFFICE.

HORACE B. ADAMS, OF OWEGO, NEW YORK.

PLANT-DUSTER.

SPECIFICATION forming part of Letters Patent No. 455,785, dated July 14, 1891.

Application filed June 13, 1890. Serial No. 355,313. (No model.)

*To all whom it may concern:*

Be it known that I, HORACE B. ADAMS, a citizen of the United States, residing in Owego, in the county of Tioga and State of New York, have invented certain new and useful Improvements in Plant-Dusters, of which the following is a specification.

The object of my invention is to produce a simple and convenient device adapted to be operated by one hand for destroying potato-bugs or for other similar purposes, all of which will be fully and clearly hereinafter described and claimed, reference being had to the accompanying drawings, in which—

Figure 1 is a side elevation. Fig. 2 is a sectional elevation cutting centrally through the body of the device and through the lower portion of the handle. Fig. 3 is a horizontal section on line $a\,b$, Fig. 1, showing the interior construction of the same.

This invention is intended for holding paris-green or other like poisons in the form of powder adapted to be dusted upon the potato or other vines or plants; and it consists of a body or dust-holding vessel 1, of any desired size, having a finely-perforated bottom 2 and a close removable cover 3.

Within the vessel 1 is a cross-brace 4, rigidly secured at the points 5 within the vessel by solder or other well-known means. The cross-brace 4 is provided with a perforation located as near the center of the vessel 1 as practicable, through which a central vertical shaft 6 projects downward to or near the perforated bottom 2, where it is rigidly connected in any well-known way to an agitating-wheel 7, provided with a series of agitating-arms 8, which rests loosely on the perforated bottom 2. Just beneath the cross-brace 4 is a removable pin 9, the object of which is to prevent the shaft 6 and agitating-wheel 7 from being drawn upward out of place.

At the top of the shaft 6 is secured by a removable pin 10 a handle 11. This handle rests on the top of the removable cover 3, so that when the handle is secured to the shaft 6 the cover 3 is kept in place.

By arranging the parts as above described the cover 3, while rendering the vessel practically so tight as to prevent the escape of the poisonous contents upward, to the annoyance and danger of the operator, also forms a bearing for the shaft 6, which, in connection with the bearing in the cross-bar 4, permits of the wheel 7 being revolved or rotated parallel with the bottom without rubbing against the sides of the vessel, which would check the movement or operation of the device. It also permits of the bottom of the vessel being made out of a sheet of perforated material, which can be secured in place in the usual manner of securing the bottom in a can, and as the lifting of the device by means of the handle raises the wheel slightly above the bottom the entire surface of the bottom is utilized for discharging the contents, and it leaves the lower part of the vessel flat and smooth, so that it can be placed upon a flat surface while it is being filled, and the escape of the contents will be prevented, which could not be done if the shaft projected through the bottom, as that would render the bottom so uneven that it would not hold the can upright without having a rim around its outer edge.

The operation of the device is as follows: The handle 11 being taken off from the shaft 6 by the removal of the pin 10, the cover 3 being then removed, the vessel 1 is in a condition to be filled with the required powdered material—paris-green, for instance—after which the cover 3 is replaced and the several parts put together and secured, substantially as shown in Fig. 2. The device may be now taken in one hand, and by giving the handle 11 a quick turn, first in one direction and then the other, the agitating-wheel 7 8 is made to turn partly around back and forth, because the shaft 6 and its agitating-wheel turn loosely within the heavier vessel 1 and have not sufficient frictional contact therewith to disturb its inertia or cause it to move enough to practically interfere with the successful operation of the device. This operation causes the dust to fall through the perforations in the bottom 2 and affords a convenient and easy means for dusting plants or vines or for other analogous purposes.

Having thus described my invention, I claim—

In a device for dusting plants, the combination, with a vessel having a perforated bottom, of a cross-bar secured to the vessel near the top, a close removable cover on the vessel having a central perforation, a vertical shaft journaled at its upper end in the cover and the cross-bar and having an agitating-wheel at its lower end resting loosely upon the bottom, a removable handle upon the upper end of the shaft for operating the device and keeping the cover in place, a pin through the shaft below the cross-bar, and another pin through the handle and the upper end of the shaft, substantially as described.

HORACE B. ADAMS.

Witnesses:
RICHARD LOADER,
CHAS. G. KIDDER.